US012759132B2

(12) United States Patent
Abel et al.

(10) Patent No.: US 12,759,132 B2
(45) Date of Patent: Oct. 13, 2026

(54) METHOD FOR PRODUCING AN ENVIRONMENT MAP FOR A MOBILE LOGISTICS ROBOT AND MOBILE LOGISTICS ROBOT

(71) Applicant: STILL GmbH, Hamburg (DE)

(72) Inventors: Bengt Abel, Lüneburg (DE); Yan Rudall, Hamburg (DE); Mohamed Bakr, Hamburg (DE); Dennis Schüthe, Buchholz (DE)

(73) Assignee: STILL GmbH, Hamburg (DE)

( * ) Notice: Subject to any disclaimer, the term of this patent is extended or adjusted under 35 U.S.C. 154(b) by 106 days.

(21) Appl. No.: 18/719,990

(22) PCT Filed: Nov. 23, 2022

(86) PCT No.: PCT/EP2022/082947

§ 371 (c)(1),
(2) Date: Jun. 14, 2024

(87) PCT Pub. No.: WO2023/110341

PCT Pub. Date: Jun. 22, 2023

(65) Prior Publication Data

US 2025/0042016 A1 Feb. 6, 2025

(30) Foreign Application Priority Data

Dec. 17, 2021 (DE) ..................... 10 2021 133 614.7

(51) Int. Cl.

| | |
|---|---|
| ***B25J 9/16*** | (2006.01) |
| ***B25J 5/00*** | (2006.01) |
| ***B25J 13/08*** | (2006.01) |

(52) U.S. Cl.

CPC ............... *B25J 5/007* (2013.01); *B25J 9/161* (2013.01); *B25J 9/1653* (2013.01); *B25J 9/1664* (2013.01); *B25J 13/089* (2013.01)

(58) Field of Classification Search

CPC . B25J 5/007; B25J 9/161; B25J 9/1653; B25J 9/1664; B25J 13/089; G05D 1/0274; G05D 1/0246

See application file for complete search history.

(56) References Cited

U.S. PATENT DOCUMENTS

| | | | | |
|---|---|---|---|---|
| 10,754,343 | B2 * | 8/2020 | Witt ..................... | G01C 21/383 |
| 2009/0226113 | A1 * | 9/2009 | Matsumoto ............ | G06V 20/36 382/284 |
| 2018/0246520 | A1 * | 8/2018 | Martinson ............ | G05D 1/0094 |
| 2019/0025838 | A1 * | 1/2019 | Artes ................... | G05D 1/0219 |
| 2019/0250627 | A1 * | 8/2019 | Witt ..................... | G01C 21/383 |
| 2020/0338733 | A1 * | 10/2020 | Dupuis ................ | G05D 1/6987 |

(Continued)

*Primary Examiner* — Adam R Mott
*Assistant Examiner* — Sagar Kc
(74) *Attorney, Agent, or Firm* — The Webb Law Firm

(57) ABSTRACT

A method for the production of an environment map (5) for a mobile logistics robot includes sensing an environment by use of a sensor system (2). The sensor data is evaluated in a processor unit (3), and a virtual grid of the environment is produced using cells. The cells in which objects (1) are detected are labeled as occupied cells and the cells in which no objects (1) are detected are labeled as free cells, as a result of which a representation of the environment is generated. The objects (1) that occupy the cells are identified in the processor unit (3). The mobile logistics robot carries out the method.

19 Claims, 2 Drawing Sheets

(56) References Cited

U.S. PATENT DOCUMENTS

| | | | | |
|---|---|---|---|---|
| 2020/0340826 | A1* | 10/2020 | Li | G01C 21/383 |
| 2021/0089040 | A1* | 3/2021 | Ebrahimi Afrouzi | G05D 1/0248 |
| 2022/0083074 | A1* | 3/2022 | Ferrer | G05D 1/0253 |
| 2022/0168893 | A1* | 6/2022 | Hamilton | B25J 9/1666 |
| 2023/0061444 | A1* | 3/2023 | Hong | G05D 1/0248 |
| 2024/0198530 | A1* | 6/2024 | Ugalde Diaz | B25J 9/1679 |

* cited by examiner

METHOD FOR PRODUCING AN ENVIRONMENT MAP FOR A MOBILE LOGISTICS ROBOT AND MOBILE LOGISTICS ROBOT

CROSS-REFERENCE TO RELATED APPLICATIONS

This application is the United States national phase of International Patent Application No. PCT/EP2022/082947 filed Nov. 23, 2022, and claims priority to German Patent Application No. 10 2021 133 614.7 filed Dec. 17, 2021, the disclosures of which are hereby incorporated by reference in their entireties.

BACKGROUND OF THE INVENTION

Field of the Invention

The invention relates to a method for producing an environment map for a mobile logistics robot, wherein the environment is sensed by means of a sensor system and the sensor data is evaluated in a processor unit, wherein a virtual grid of the environment is produced using cells, and wherein the cells in which objects are detected are labeled as occupied cells and the cells in which no objects are detected are labeled as free cells, as a result of which a representation of the environment is produced.

The invention further relates to a mobile logistics robot for carrying out the method.

Description of Related Art

Mobile logistics robots are increasingly used in industry and in logistics operations to automate industrial manufacturing processes as well as to automate logistics tasks such as order picking, for example. The robots most commonly used in these operations are mobile logistics robots with arm manipulators, in particular robot arms. Articulated arm robots are one example of this type of robot.

The deployment of mobile logistics robots, in particular autonomous guided vehicles with robot arms for load handling, e.g. mobile order-picking robots, is particularly challenging because logistics robots must be able to move freely in a logistics area such as a warehouse building, for example. The mobile logistics robots are therefore constantly encountering ever-changing working environments.

To make possible the localization and navigation of a mobile logistics robot in changing environmental conditions of this type, environment maps for the mobile logistics robot must be constantly updated.

There are different methods for producing environment maps for mobile logistics robots. On one hand, 2D maps, which are also called grid maps, can be used, in which the data from 2D sensor systems such as laser scans, can be entered. The grid map is based on a pattern, the grid, with cells that are each the size of 10 cm×10 cm, for example. Everything that is seen with the 2D sensor system is labeled as "occupied" in the map. Cells that are clear from the sensor source to an object are labeled as free. The result is a 2D representation of the environment, although without the information about what the object is, i.e. without the information what object occupies the cell. The same method can also be used with a 3D sensor system. In the case of a 3D sensor system, an octree is used, for example. The method for a 3D sensor system is identical to that using the 2D sensor system, wherein the only difference is that the cells are now three-dimensional, i.e. with the dimensions 10 cm×10 cm×10 cm, for example. Only the actual sensor information is also used for the map, so that the result is a representation of the environment. No conclusion about objects in the map, i.e. what objects are occupying the cells, is possible, or such a conclusion requires subsequent processing.

SUMMARY OF THE INVENTION

The object of this invention is to provide a method of the type described above and a mobile logistics robot to carry out the method so that environment maps with a higher information content can be produced.

The invention accomplishes this object in that the objects that are occupying the cells are identified in the processor unit.

The invention makes it possible to close the gap in the known mapping methods, which is that the known maps are unable to identify the objects that occupy the cells. With the identification of the objects, it thereby becomes possible to enter the result of the identification of the objects in the environment map produced, i.e. the information about what object is occupying a cell. With the invention, the mobile logistics robot receives specific information about where what objects are located.

As part of this process the objects are appropriately identified by means of image processing methods. In this context it is advantageous to use a sensor system that comprises at least one optical sensor, in particular a camera. In the processor unit, the sensor data can then be evaluated by means of imaging methods so that the objects can be identified.

In one preferred development of the invention, the objects are identified by means of artificial intelligence methods.

For the identification, the objects are advantageously recognized in at least one object recognition unit of the processor unit, which works in particular with imaging processes and/or artificial intelligence.

With the recognition of objects it becomes possible to enter the objects with their current posture, i.e. both the translational spatial coordinates, x, y and z, as well as the orientation coordinates, roll, pitch and yaw, i.e. with their position and orientation, as well as with their dimensions, i.e. with height and depth, into the environment map. An object that is recognized repeatedly can be used as a natural landmark for localization.

For identification, the objects can also be classified in at least one classification unit of the processor unit. For this purpose, in addition to the three-dimensional position and the dimensions of the object, at least one additional characteristic of the detected object can be taken into consideration for entry into the map.

The objects are preferably classified into static, manipulable and dynamic objects and entered into the environment map. The objects are therefore divided into categories that include static objects, such as walls, columns and shelves, for example, manipulable objects, such as pallets, boxes and pallet cages, for example, and dynamic objects such as people and vehicles, for example. The dynamic objects must never be used for localization, and can therefore always be excluded from this task. The information, however, is useful, for example for a management system which can detect where exactly each vehicle is.

The environment map generated can thereby be constructed from the following three parts, for example:

1) Map for static objects: This map is very well suited for the localization of the mobile logistics robot.
2) Map for manipulable objects: This map can be used to track goods and therefore to take inventory.
3) Map for dynamic objects: This map can be used, for example, for the localization of all vehicles, both robotic and non-robotic vehicles that have no sensor systems on board.

As a result, by means of such a map structure, a digital twin of the environment of the logistics robot, in particular of a warehouse including inventory, can be produced in the processor unit.

The environment map can be configured in a variety of ways, e.g. with all objects in one map or distributed over a plurality of maps.

To increase the quality of identification of objects, in one preferred development of the invention, a plurality of classification units, in particular different classification units, and/or a plurality of object recognition units, in particular different object recognition units, are consolidated.

The consolidation can also be performed upstream of the classification and/or the object recognition. For example, sensor signals from different sensors of the sensor system can be transmitted to the classification unit and/or object recognition unit.

For this purpose, different sensor types can be used as inputs, such as, for example, laser scanners, RGB cameras, depth cameras, RGBD cameras, radar sensors etc.

The objects to be identified can in particular be all objects that can be found in a warehouse or its outdoor operating areas. These objects include, for example, pallets, fire extinguishers, doors, emergency exit signs, walls, ceilings, floor markings etc.

The invention further relates to a mobile logistics robot to carry out the method with an apparatus to generate an environment map for the mobile logistics robot that comprises a sensor system for the sensing of the environment of the mobile logistic robot and a processor unit for the evaluation of the sensor data, wherein the processor unit is designed to generate a virtual grid of the environment with cells and to label the cells in which objects are detected as occupied and the cells in which no object is detected as free cells, as a result of which a representation of the environment can be generated.

The mobile logistics robot accomplishes the stated object in that the processor unit comprises an identification unit which is designed to identify the objects that occupy the cells.

The identification unit thereby appropriately comprises at least one classification unit and/or at least one object recognition unit.

The sensor system preferably further comprises an optical sensor, in particular a laser scanner and/or a camera.

The sensor system can also comprise at least one radar sensor.

The invention offers a whole series of advantages:

The invention makes it possible to produce a semantic map as a map of the environment of the mobile logistics robot. The information gap concerning the identification of the objects that appear in a map can thereby be closed. The quantity of data for this semantic map can also be significantly smaller, which results in a conservation of resources. The invention further makes it possible to easily reach conclusions about where what objects are located.

The maps also contain significantly more information concerning the objects, so that filtering by objects can also be performed to locate them or to manipulate them, i.e. to pick them up, to relocate them etc. Overall, a great many more operations based on the semantic map can be carried out than with conventional mapping methods such as with grid maps, for example.

There are above all configuration capabilities in the digital services on which the map according to the invention is based. For example, the invention can be used to take inventory, to track goods inside a warehouse, to detect damage to infrastructure, to detect anomalies (such as blocked emergency exits or vehicles in no-parking zones), and to avoid and prevent accidents.

BRIEF DESCRIPTION OF THE DRAWINGS

The terms Fig., Figs., Figure, and Figures are used interchangeably in the specification to refer to the corresponding figures in the drawings.

Additional advantages and details of the invention are described in greater detail below with reference to the exemplary embodiments illustrated in the accompanying schematic figures, in which.

DESCRIPTION OF THE INVENTION

Figure 1:
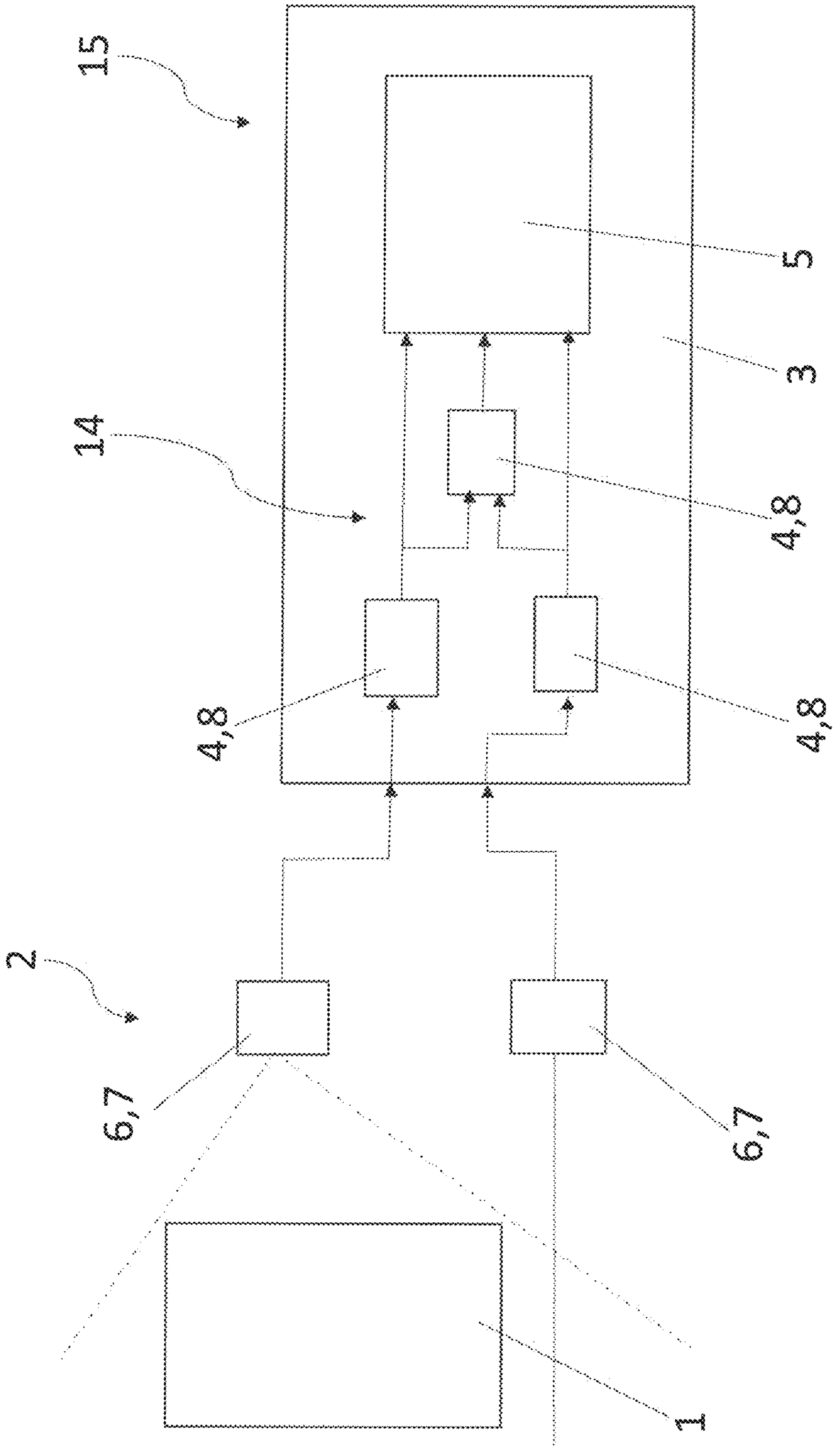
FIG. 1 is a flowchart for the production of the environment map.

FIG. 1 is a flowchart for the production of the environment map 5 according to the invention for a mobile logistics robot by means of a device 15. The object 1, such as a shelf for example, is detected by the sensor system 2, which comprises optical sensors 6, which are in the form of cameras 7, for example. The sensor data from the sensors 6 is transmitted to the processor unit 3, which has an identification unit 14, which comprises object recognition units 4 and classification units 8. The object recognition units 4 recognize the object by means of image processing methods, for example, and determine the position, orientation and spread (dimensions) of the object 1. The classification units 8 classify the object 1, for example using artificial intelligence methods, as a static, manipulable or dynamic object 1.

To increase the quality of object recognition and object classification, a plurality of classification units 8 and object recognition units 4 can be consolidated.

The environment map 5 is created in the processor unit 3 from the results of the classification units 8 and object recognition units 4. The environment map 5 therefore includes recognized objects 1 with their position, orientation and spread (dimensions), as well as with the additional property, of what type of object 1 it is, i.e. whether it is a static object or a manipulable object or a dynamic object.

The sensor signals from the different sensors 6 of the sensor system 2 can also be consolidated upstream of the object recognition units 4 and classification units 8 and transmitted to them.

Figure 2:
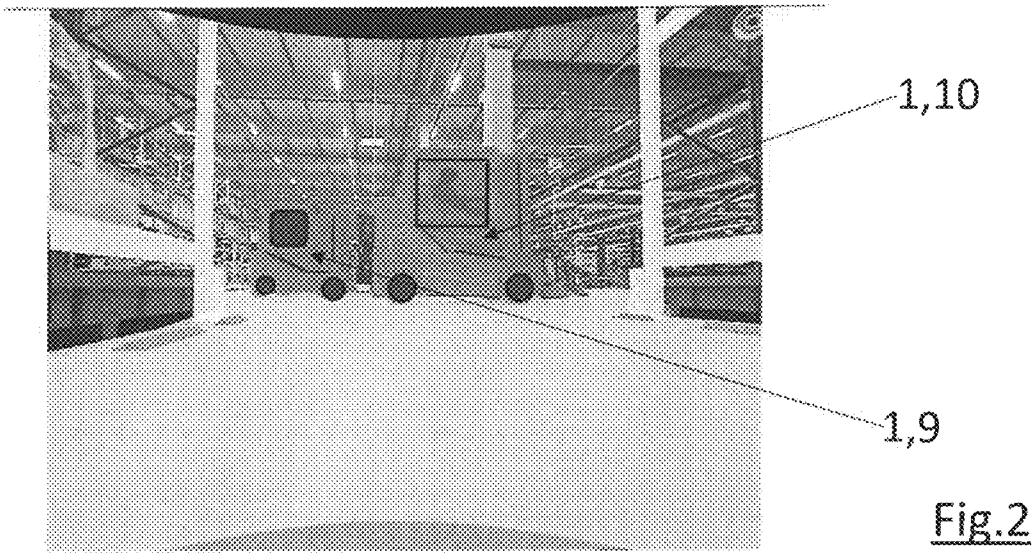
FIG. 2 shows one example of a classification of dynamic objects.

FIG. 2 shows one example of a classification of dynamic objects 1 from the point of view of the mobile logistics robot which is provided with the device 15 illustrated in FIG. 1. Industrial trucks 9 and 10 in the vicinity of the mobile logistics robot are therefore classified as dynamic objects 1 and entered as such into the environment map. The dynamic objects 1 must never be used for localization and can therefore always be excluded from this task. The information, however, is useful, for example for a management system that can detect the exact location of each industrial truck 9, 10.

Figure 3:
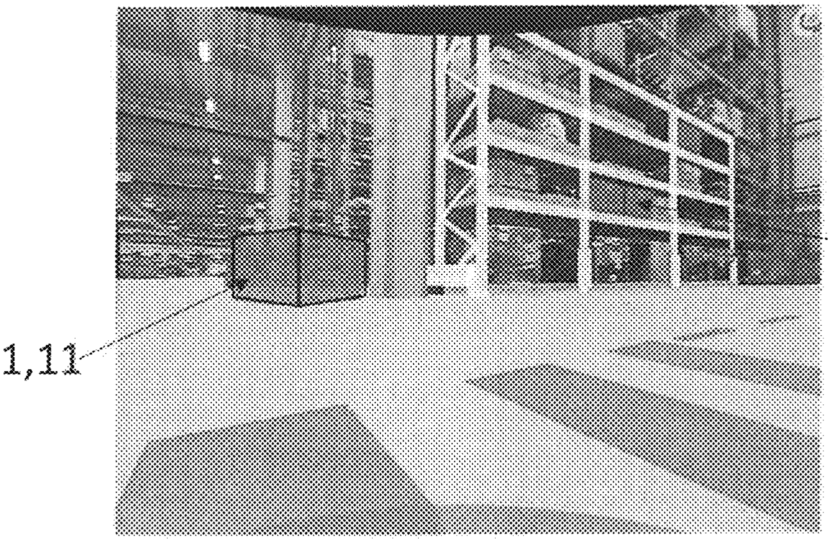
FIG. 3 shows one example of a classification of manipulable objects.

FIG. 3 shows one example of a classification of manipulable objects 1 from the point of view of the mobile logistics robot which is provided with the device 15 in FIG. 1. Packages 11 and 12 in the vicinity of the mobile logistics robot are therefore classified as manipulable objects 1 and entered as such into the environment map. This information can be used to track goods and therefore to take inventory.

Figure 4:
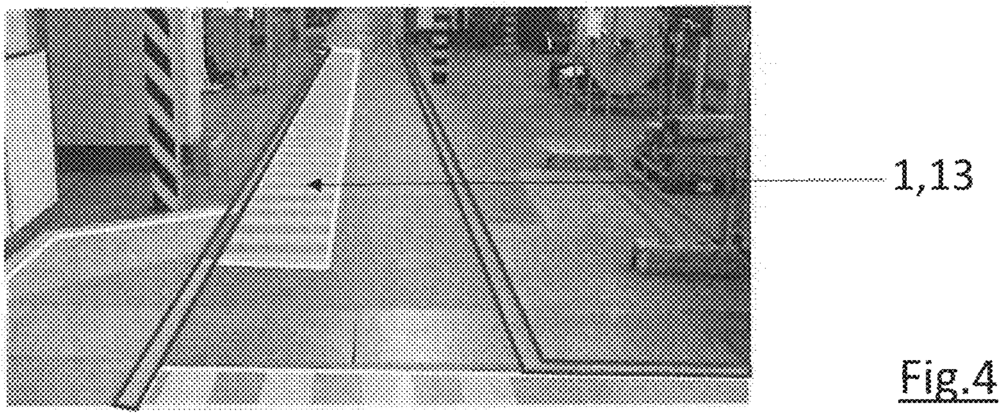
FIG. 4 shows one example of a classification of static objects.

Finally, FIG. 4 shows one example of a classification of static objects 1 from the point of view of the mobile logistics robot which is provided with the device 15 in FIG. 1. Floor markings 13 in the vicinity of the mobile logistics robot are therefore classified as static objects 1 and entered as such into the environment map. The floor markings 13 can be used for the localization and navigation of the mobile logistics robot.

The invention claimed is:

1. A method for production of an environment map for a mobile logistics robot, comprising:
- sensing an environment using a sensor system of the mobile logistics robot, to produce sensor data;
- evaluating the sensor data in a processor unit; and
- generate an environment map of the environment by, in part, producing a virtual grid of the environment using the processor unit, the virtual grid comprising a plurality of discrete cells that partition the environment into two- or three-dimensional spatial regions, wherein generating the environment map comprises:
  - detecting, based on the sensor data, objects in a first set of cells of the plurality of discrete cells;
  - labeling cells of the first set of cells as occupied;
  - identifying the objects that occupy the first set of cells;
  - classifying, based on identifying the objects, each object that occupies the first set of cells as belonging to one of three categories, the three categories comprising static objects, manipulable objects that are movable by the mobile logistics robot, and dynamic objects that move in the environment not by the mobile logistics robot;
  - detecting, based on the sensor data, no objects in a second set of cells of the plurality of discrete cells; and
  - labeling cells of the second set of cells as free; and
- navigating the mobile logistics robot in the environment using the environment map.

2. The method according to claim 1, wherein the objects are identified by image processing methods.

3. The method according to claim 1, wherein the objects are identified by artificial intelligence methods.

4. The method according to claim 1, wherein the objects are recognized in at least one object recognition unit of the processor unit.

5. The method according to claim 4, wherein the processor unit comprises a plurality of object recognition units, and wherein a plurality of classification units and/or the plurality of object recognition units are consolidated.

6. The method according to claim 4, wherein sensor signals from different sensors of the sensor system are transmitted to at least one classification unit of the processor unit and/or the at least one object recognition unit.

7. The method according to claim 1, wherein the objects are entered into the environment map with their position and orientation as well as their dimensions.

8. The method according to claim 1, wherein the objects are classified in at least one object classification unit of the processor unit.

9. The method according to claim 8, wherein the processor unit comprises a plurality of object classification units, and wherein the plurality of object classification units and/or a plurality of object recognition units are consolidated.

10. The method according to claim 8, wherein sensor signals from different sensors of the sensor system are transmitted to the at least one object classification unit and/or at least one object recognition unit.

11. The method according to claim 1, wherein a digital twin of the environment is generated in the processor unit.

12. A mobile logistics robot to carry out a production of an environment map comprising:
- a device for generation of the environment map for the mobile logistics robot, the device comprising:
  - a sensor system for sensing of an environment of the mobile logistics robot; and
  - a processor unit for evaluation of sensor data,
- wherein the processor unit is designed to:
  - generate the environment map of the environment by, in part, producing a virtual grid of the environment, the virtual grid comprising a plurality of discrete cells that partition the environment into two- or three-dimensional spatial regions, wherein, when generating the environment map, the processor unit is designed to:
    - detect, based on the sensor data, objects in a first set of cells of the plurality of discrete cells;
    - identify the objects that occupy the first set of cells;
    - classify, based on identifying the objects, each object that occupies the first set of cells as belonging to one of three categories, the three categories comprising static objects, manipulable objects that are movable by the mobile logistics robot, and dynamic objects that move in the environment not by the mobile logistics robot;
    - label cells of the first set of cells as occupied;
    - detect, based on the sensor data, no objects in a second set of cells of the plurality of discrete cells; and
    - label cells of the second set of cells as free; and
  - navigate the mobile logistics robot in the environment using the environment map.

13. The mobile logistics robot according to claim 12, wherein the processor unit comprises an identification unit designed to identify the objects that occupy the first set of cells, wherein the identification unit comprises at least one classification unit and/or at least one object recognition unit.

14. The mobile logistics robot according to claim 13, wherein the sensor system comprises at least one optical sensor.

15. The mobile logistics robot according to claim 14, wherein the at least one optical sensor is a laser scanner and/or a camera.

16. The mobile logistics robot according to claim 13, wherein the sensor system comprises at least one radar sensor.

17. The mobile logistics robot according to claim 12, wherein the sensor system comprises at least one optical sensor.

18. The mobile logistics robot according to claim 17, wherein the at least one optical sensor is a laser scanner and/or a camera.

19. The mobile logistics robot according to claim 12, wherein the sensor system comprises at least one radar sensor.

* * * * *